(12) United States Patent
Fleytman

(10) Patent No.: US 7,653,981 B2
(45) Date of Patent: Feb. 2, 2010

(54) METHOD OF PROVIDING A HOUSING FOR A PERMANENT MAGNET ELECTRIC MOTOR

(75) Inventor: Yakov Fleytman, Flowery Branch, GA (US)

(73) Assignee: Brose Fahrzeugteile GmbH & Co. Kommanditgesellschaft, Würzburg, Wurzburg (DE)

( * ) Notice: Subject to any disclaimer, the term of this patent is extended or adjusted under 35 U.S.C. 154(b) by 0 days.

(21) Appl. No.: 11/902,446

(22) Filed: Sep. 21, 2007

(65) Prior Publication Data

US 2008/0079321 A1 Apr. 3, 2008

Related U.S. Application Data

(60) Provisional application No. 60/827,232, filed on Sep. 28, 2006.

(51) Int. Cl.
*H02K 15/10* (2006.01)
(52) U.S. Cl. ............................... 29/596; 29/605; 310/42
(58) Field of Classification Search .......... 29/596–598, 29/732, 564.2, 605–606; 310/58–63, 60 R, 310/42, 89
See application file for complete search history.

(56) References Cited

U.S. PATENT DOCUMENTS

| 2,973,154 | A | | 2/1961 | Blackburn |
| 4,047,138 | A | * | 9/1977 | Steigerwald ................ 336/100 |
| 4,529,177 | A | | 7/1985 | Sheth et al. |
| 4,765,054 | A | * | 8/1988 | Sauerwein et al. ............ 29/596 |
| 5,174,013 | A | * | 12/1992 | Hiroshima et al. ........... 29/605 |
| 5,584,114 | A | | 12/1996 | McManus |
| 6,060,799 | A | | 5/2000 | McManus et al. |
| 6,242,824 | B1 | * | 6/2001 | Torii et al. .................... 310/42 |
| 6,462,448 | B1 | | 10/2002 | Du |
| 6,838,797 | B2 | | 1/2005 | Du |
| 7,124,977 | B2 | | 10/2006 | Sweeney et al. |
| 7,159,816 | B2 | | 1/2007 | Sweeney et al. |
| 2008/0079321 | A1 | * | 4/2008 | Fleytman ..................... 310/43 |

* cited by examiner

*Primary Examiner*—Minh Trinh
(74) *Attorney, Agent, or Firm*—Manelli Denison & Selter pllc; Edward J. Stemberger

(57) ABSTRACT

A method of providing a housing assembly for a permanent magnet electric motor provides a frame holder having external surface features at an end thereof defining bearing support features. A plastic frame is provided over a portion of the frame holder. The plastic frame has internal surfaces features corresponding to the external surface features of the frame holder. The plastic frame has lamination receiving portions. Permanent magnets are placed adjacent to portions of the frame holder and between the lamination receiving portions of the plastic frame. A ferrous lamination is wound over the lamination receiving portions and the magnets to define flux structure.

11 Claims, 4 Drawing Sheets

METHOD OF PROVIDING A HOUSING FOR A PERMANENT MAGNET ELECTRIC MOTOR

This application claims the benefit of the earlier filing date of U.S. Provisional Application No. 60/827,232, filed on Sep. 28, 2006, which is hereby incorporated by reference into this specification.

FIELD OF THE INVENTION

The invention relates to electric motors and, more particularly, to forming a housing as the magnetic core of the motor.

BACKGROUND OF THE INVENTION

In permanent magnet electric motors, the motor housing is typically of pure ferromagnetic material (e.g., steel). Recently, to reduce weight and the amount of ferromagnetic material, permanent magnets are attached to flux material (e.g., metal) and this assembly is over-molded with resin to form the housing. A conventional motor housing 10 of this type is shown in FIG. 1. The goal is to resin formed housing is to have the flux material only at the magnet location. An example of this type of motor with a resin formed housing is disclosed in U.S. Pat. No. 5,584,114. There is an opportunity to further reduce the metal content of these types of motors.

There is a need to provide an improved permanent magnet electric motor housing having a reduce metal content and capable of being configured for different size and shape motors.

SUMMARY OF THE INVENTION

An object of the invention is to fulfill the need referred to above. In accordance with the principles of the present invention, this objective is obtained by a method of providing a housing for a permanent magnet electric motor. The method provides a plastic frame holder having external surface features at an end thereof defining bearing support features. A frame is provided over a portion of the frame holder. The frame has internal surfaces features corresponding to the external surface features of the frame holder. The frame has lamination receiving portions. Permanent magnets are provided adjacent to portions of the frame holder and between the lamination receiving portions of the frame. A ferrous lamination is wound over the lamination receiving portions and the magnets to define flux structure.

In accordance with another aspect of the invention, a housing is provided for a permanent magnet electric motor. The housing includes a plastic frame defining bearing support features at one end thereof. Permanent magnet structure is associated with the frame so as to be exposed to an interior of the housing. Ferrous lamination material, defining flux structure, is wound around an exterior of the magnet structure and portions of the plastic frame.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
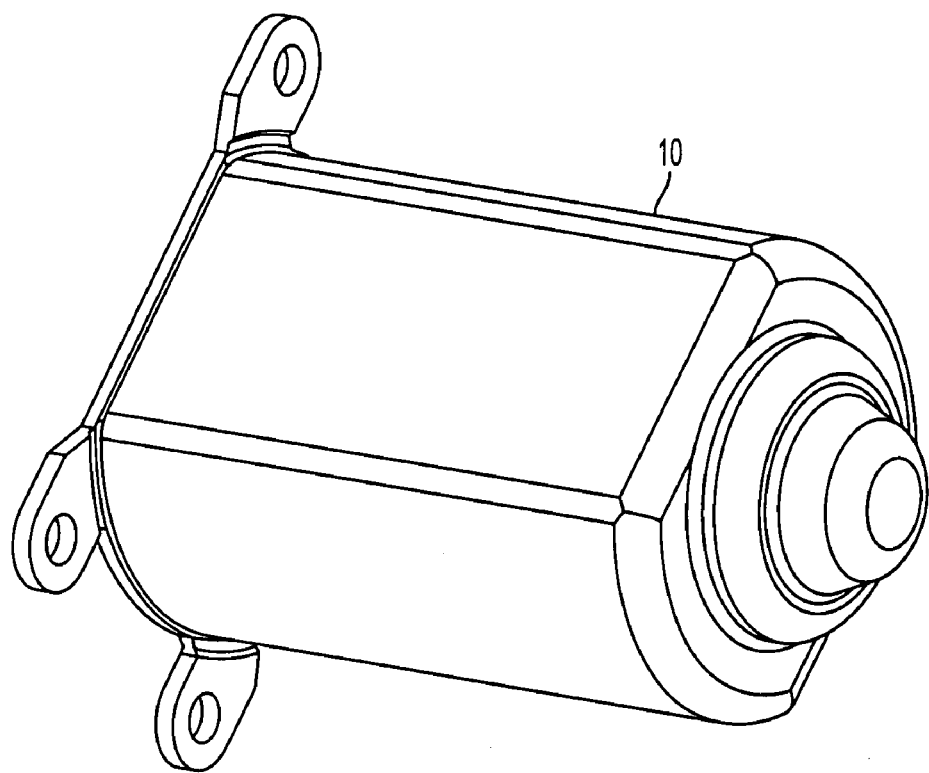
FIG. 1 is a view of a conventional resin/metal housing of a permanent magnet electric motor.
Figure 2:
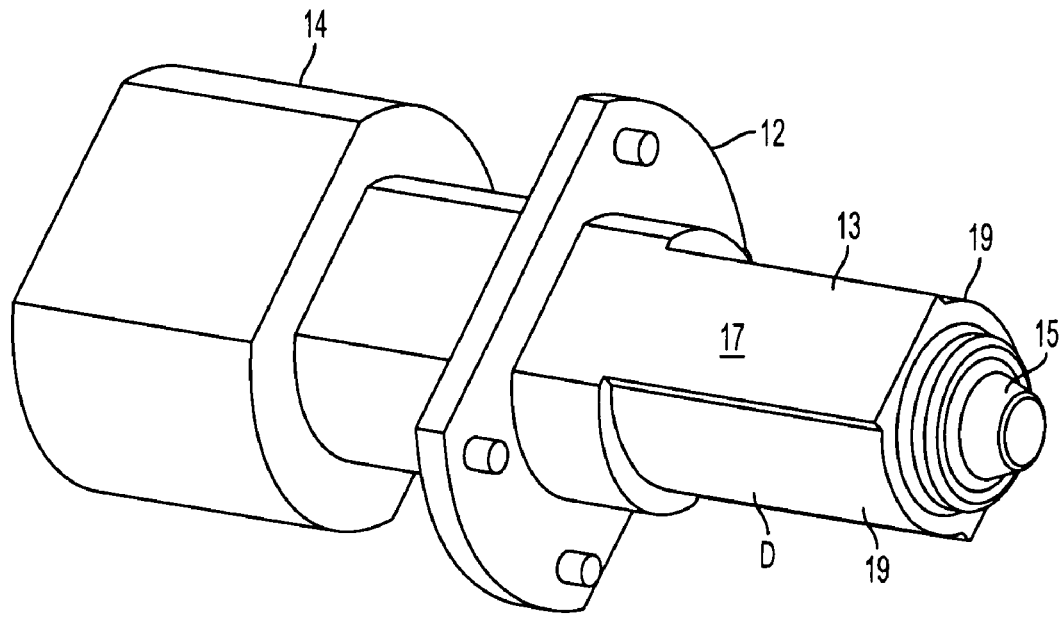
FIG. 2 is a view of a frame holder coupled with a motor for rotating the frame holder in accordance with the principles of an embodiment of the invention.

With reference to FIG. 2, a frame holder 12, preferably of plastic, is shown coupled to a motor 14 for rotating the frame holder, the function of which will be explained below. The frame holder 12 is constructed and arranged to be used form a housing, generally indicated at 16 (FIG. 6) of a permanent magnet electric motor in accordance with the principles of an embodiment of the invention. The frame holder 12 has opposing generally flat portions 17 and opposing generally cylindrical portions 19, the function of which will be explained below. It is noted that only one flat portion 17 can be seen in FIG. 2. The frame holder 12 also includes an end having external features 15 constructed and arranged to support a bearing of a motor.

The dimension D (periphery of portion 13 of the frame holder 12) in FIG. 2 is represented as $D=d_{arm}+2\Delta$, where $d_{arm}$ is the diameter of the armature (not shown) to be received by the formed housing 16, and $\Delta$ is the required gap between magnet structure of the housing 16 and the armature. The frame holder 12 and motor 14 are part of assembly equipment for assembling housing 16.

Figure 3:
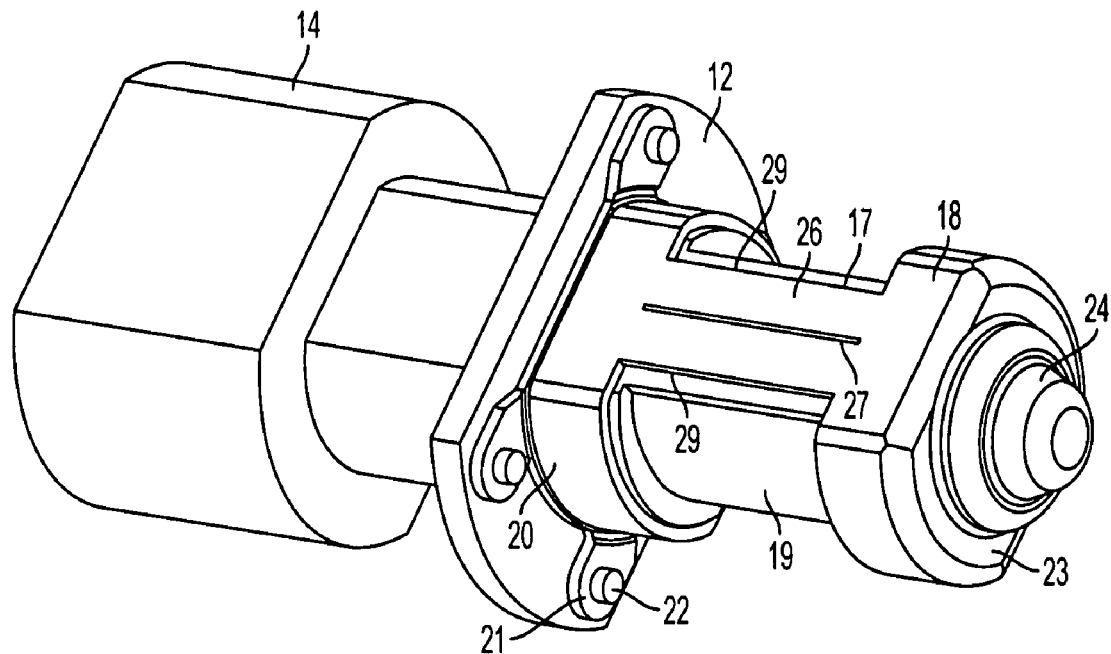
FIG. 3 shows a plastic frame structure coupled with the frame holder of FIG. 2.

With reference to FIG. 3, a plastic frame 18 is provided on the frame holder 12. The frame 18 has one end 20 that includes mounting holes 21 that receive projections 22 of the frame holder 12. Another end 23 of the frame 18 is defined over the external bearing support features 15 of the frame holder 12 so as to have corresponding internal bearing support features 24. Opposing lamination receiving portions 26 (preferably flat portions) of the frame 18 extend over the flat portions 17 of the frame holder 12, coupling end 20 to end 23. At least one of the portions 26 includes a slit 27 therein sized to receive an end of a steel sheet lamination as expend below. The cylindrical portions 19 of the frame holder 12 remain uncovered by the frame 18 due to openings 29 in the frame 18 between the portions 26 thereof.

Figure 4:
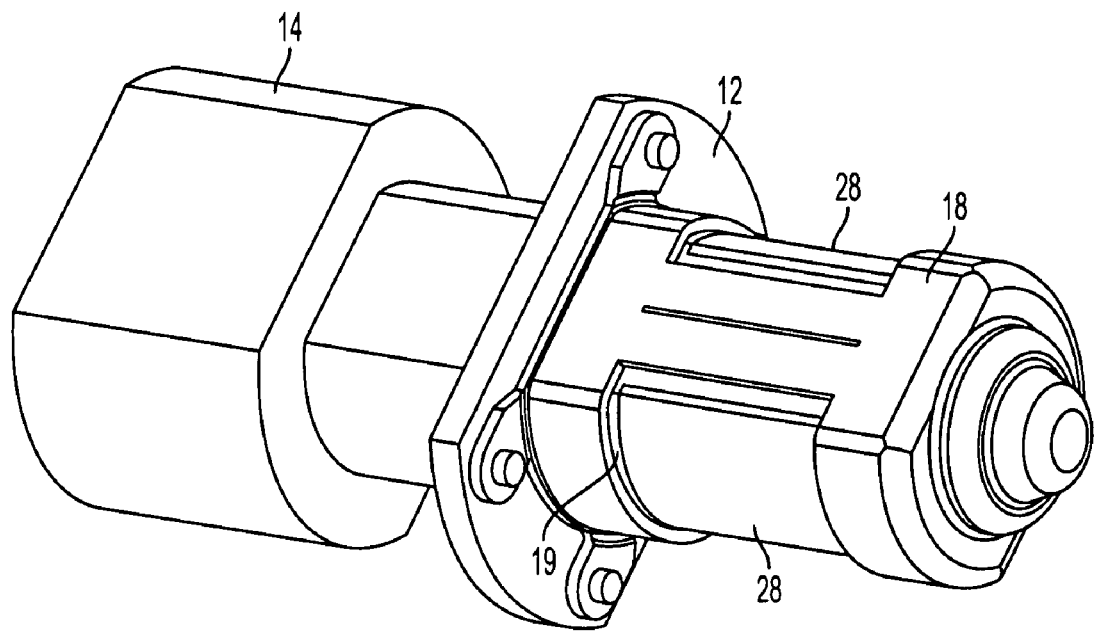
FIG. 4 shows permanent magnets associated with the frame structure of FIG. 3.

With references to FIG. 4, permanent magnet structure is shown assembled. In the embodiment, the permanent magnet structure includes at least a pair of arc-shaped permanent magnets 28 placed over the cylindrical portions 19 of the frame holder 12 in the openings 29 between the lamination receiving portions 26. Preferably, the frame 18 is molded over the frame holder 12 together with the magnets 28 (e.g., at the same time) which improves sealing of the finished housing 16.

Figure 5:
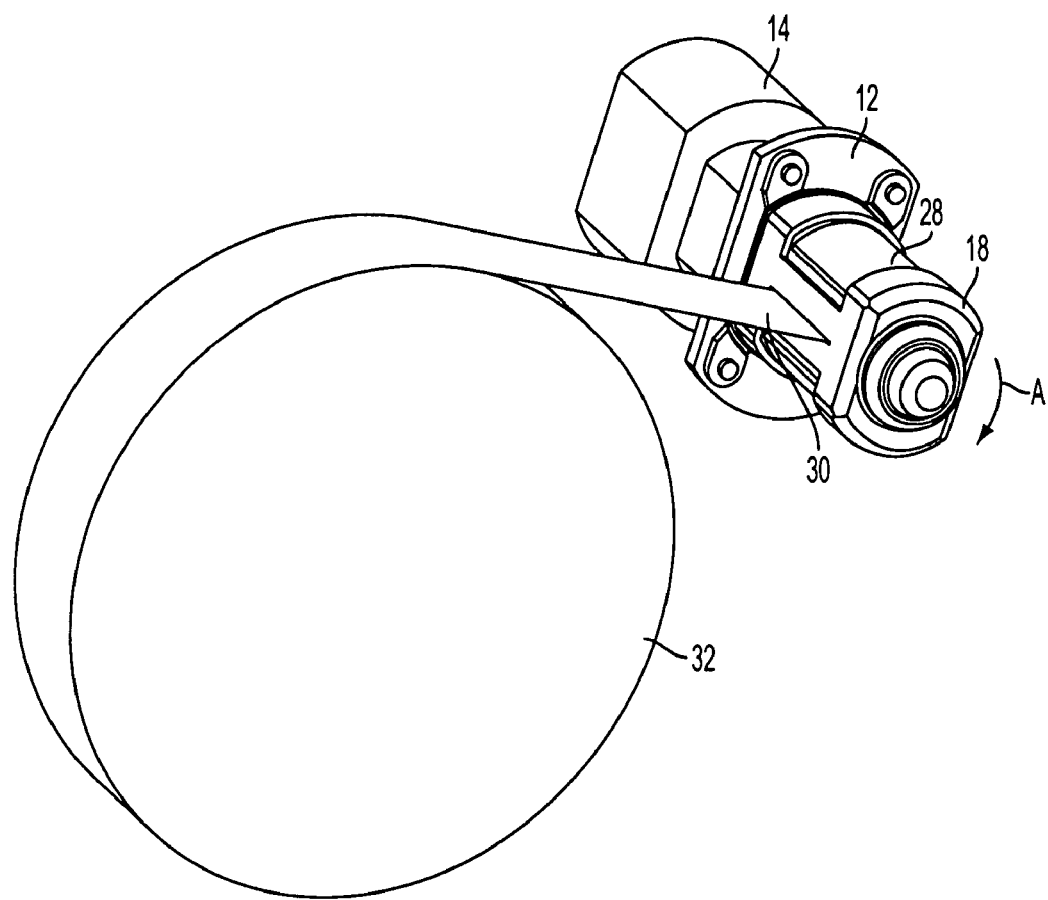
FIG. 5 shows an embodiment where steel sheet lamination is wound on the frame and magnets of FIG. 4.
Figure 6:
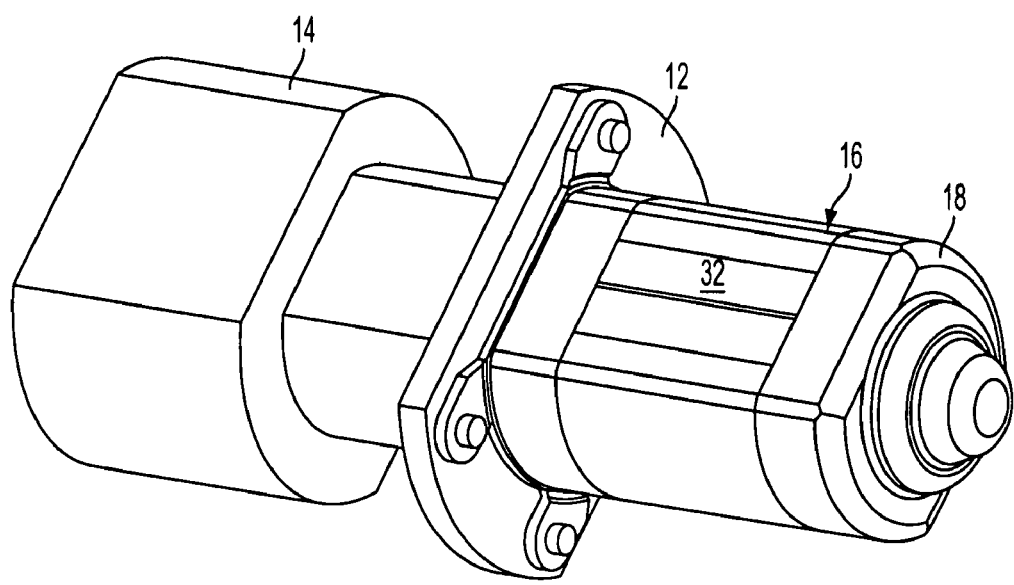
FIG. 6 shows a completed motor housing, disposed on the frame holder, with wound steel sheet lamination of FIG. 5 thereon.

As shown in FIG. 5, after the magnets 28 are in place, an end 30 of continuous ferrous sheet lamination 32 (e.g., transformer steel) is received in the slit 27 of the frame 18. Next, the motor 14 is operated to cause rotation of the frame holder 12 and thus the frame 18 and magnets 28 in the direction of arrow A, causing the sheet lamination 32 to be wound over the exterior of magnets 28 and the lamination receiving portions 26 of the frame 18. The steel sheet lamination 32 thus defines magnetic flux structure for a motor housing 16 as shown in FIG. 6 and functions similar to a conventional flux ring. Thus, once the winding of the steel sheet lamination 32 is completed, the housing 16 can be removed from the frame holder 12 to define a motor housing 16 of plastic material having permanent magnets 28 covered by the flux structure 32. The motor housing 16 can then be assembled with an armature of a motor in the conventional manner such that the magnets 28 are exposed to the interior of the housing and adjacent to armature windings.

Figure 7:
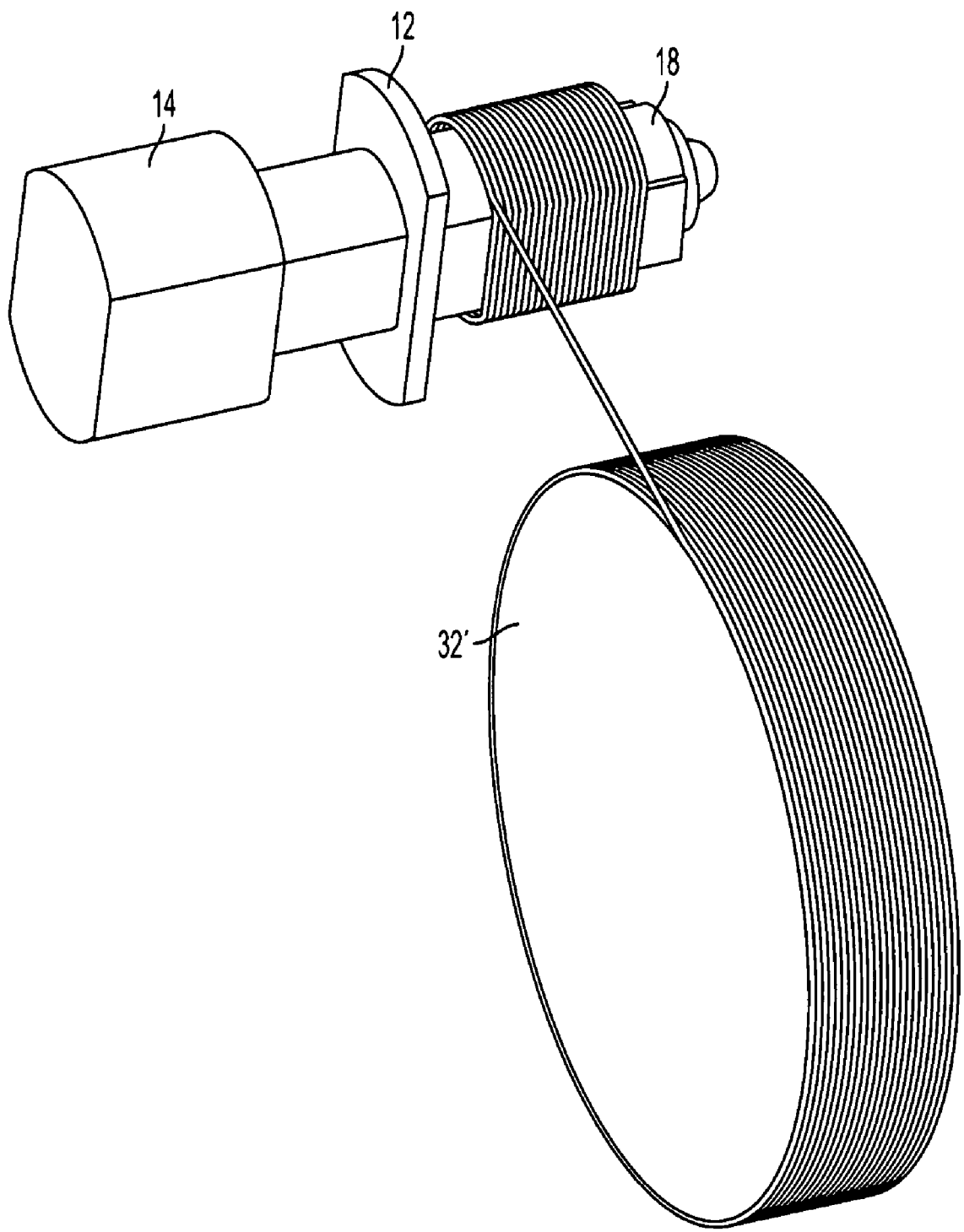
FIG. 7 shows an embodiment where steel wire lamination is wound on the frame and magnets of FIG. 4.

With reference to FIG. 7, instead of using steel sheet lamination, a continuous ferrous (e.g., steel) wire lamination 32' can be used to cover the magnets 28 and lamination receiving portions 26.

Thus, the assembly of the housing 16 reduces the use of metal as compared to conventional housings. In addition, the gap between an armature and magnets 28 can be controlled accurately. The method of making the housing is flexible in that various housing configurations of different sizes and shapes can be made. Still further, more accurate alignment between a rear bearing and the axis of rotation of the armature can be achieved due to the forming of the bearing support features 24.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of providing a housing for a permanent magnet electric motor, the method comprising:
   providing a frame holder having external surface features at an end thereof defining bearing support features,
   providing a plastic frame over a portion of the frame holder, the plastic frame having internal surfaces features corresponding to the external surface features of the frame holder, the plastic frame having lamination receiving portions,
   placing permanent magnets adjacent to portions of the frame holder and between the lamination receiving portions of the plastic frame, and
   winding a ferrous lamination over the lamination receiving portions and the magnets to define flux structure.

2. The method of claim 1, wherein the step of winding includes providing a motor to rotate the frame holder.

3. The method of claim 1, wherein the step of winding includes winding a lamination in the form of a continuous steel sheet.

4. The method of claim 3, wherein the steel sheet is transformer steel.

5. The method of claim 1, wherein the step of winding includes winding a lamination in the form of a continuous steel wire.

6. The method of claim 1, wherein the step of providing the plastic frame includes providing surfaces defining openings in the plastic frame between the lamination receiving portions and wherein the step of providing the magnets includes providing the magnets in the openings.

7. The method of claim 6, wherein the plastic frame is molded over the frame holder together with the magnets.

8. The method of claim 1, wherein the permanent magnets are arc-shaped and are placed adjacent to cylindrical portions of the frame holder.

9. The method of claim 1, wherein at least one lamination receiving portion includes a slit therein, the step of winding includes placing an end of the lamination into the slit and then rotating the frame holder to wind the lamination over the lamination receiving portions and the magnets.

10. The method of claim 1, wherein the step of providing the frame holder includes:
    providing a periphery D of the frame holder to have the relationship $D = d_{arm} + 2\Delta$, where $d_{arm}$ is a diameter of an armature to be received in the housing, and $\Delta$ is a size of a gap between the magnets and the armature.

11. The method of claim 1, further comprising removing the plastic frame with magnets and flux structure from the frame holder.

* * * * *